United States Patent [19]

De Leeuw et al.

[11] Patent Number: 5,057,912

[45] Date of Patent: Oct. 15, 1991

[54] CATHODE-RAY TUBE WITH INTERFERENCE FILTER AND PROJECTION TELEVISION SYSTEM EMPLOYING SAME

[75] Inventors: Dagobert M. De Leeuw; Dirk B. M. Klaassen; Cornelis A. H. A. Mutsaers, all of Eindhoven, Netherlands

[73] Assignee: U.S. Philips Corporation, New York, N.Y.

[21] Appl. No.: 550,595

[22] Filed: Jul. 10, 1990

[30] Foreign Application Priority Data

Jul. 10, 1989 [NL] Netherlands ......................... 8901752

[51] Int. Cl.⁵ ........................ H04N 9/160; H04N 9/18
[52] U.S. Cl. ........................ 358/64; 358/60; 358/65
[58] Field of Search ........................ 358/60, 63, 64, 66; 313/467, 482, 474, 480, 482

[56] References Cited

U.S. PATENT DOCUMENTS

| | | | |
|---|---|---|---|
| 4,038,205 | 7/1977 | Minnier et al. | 313/467 |
| 4,539,506 | 9/1985 | Ohtani et al. | 315/467 |
| 4,804,882 | 2/1989 | Takahara et al. | 313/468 |
| 4,807,014 | 2/1989 | Van Gorkum et al. | 358/65 |
| 4,859,902 | 8/1989 | De Leeuw et al. | 313/474 |
| 4,874,985 | 10/1989 | Hase et al. | 313/487 |
| 4,922,158 | 5/1990 | Colak | 315/383 |

Primary Examiner—Howard W. Britton
Assistant Examiner—Tuan V. Ho
Attorney, Agent, or Firm—John C. Fox

[57] ABSTRACT

A projection television system comprising a cathode-ray tube having a face plate, a display screen coated with a phosphor of the type ZnS:Ag and an interference filter arranged between the display screen and the face plate.

The ZnS:Ag has an admixture which slightly increases the y-coordinate of the light emitted by the phosphor.

This enables an increased maximum luminance in the white-D-point without the y-coordinate of the light emitted by the cathode-ray tube becoming too low.

22 Claims, 3 Drawing Sheets

CATHODE-RAY TUBE WITH INTERFERENCE FILTER AND PROJECTION TELEVISION SYSTEM EMPLOYING SAME

BACKGROUND OF THE INVENTION

The invention relates to a projection television system comprising a cathode-ray tube having a face plate, a display screen coated with a blue cathodoluminescing phosphor containing ZnS:Ag and an interference filter arranged between the face plate and the display screen.

The invention also relates to a cathode-ray tube suitable for use in a projection television system.

A projection television system of the type defined in the opening paragraph and a cathode-ray tube mentioned in the second paragraph are known from Journal of the Electrochemical Society, volume 135, No. 2, pages 858–862.

Important parameters for a projection television system are the chromaticity coordinates of the primary colours red, green and blue and the maximum achievable spectral energy distribution for what is commonly denoted the white-D-point. The chromaticity coordinates are important since only colours within a triangle in the CIE (International Commission on Illumination) 1931 diagram, whose vertices are formed by the chromaticity points of the primary colours, can be displayed by a television system. In practice, the aim is for the chromaticity coordinates of the primary colours to satisfy standards, for example the EBU standards. These standards are inter alia mentioned in "E.B.U. standard for chromaticity tolerance for studio monitors, E.B.U. Technical Centre, Tech. 3213-E, Brussels 1975". In practice, for the cathode-ray tube emitting blue light the y-coordinate of the emitted light is generally of greater importance than the x-coordinate.

The white-D-point is a point in the CIE 1931 chromaticity coordinates diagram having the chromaticity coordinates $x=0.313$ and $y=0.329$. The maximum luminance in this point is determined by the following parameter, denoted Q in the remainder of this description, of the blue light emitting cathode-ray tube:

$$Q = \frac{L}{y} \eta \, CR$$

Therein $\eta CR$ is the energy efficiency of the blue luminescing phosphor,

L is the lumen equivalent of the spectral emission of the blue light, and y is the y-coordinate of the chromaticity coordinates of the blue light.

A known blue phosphor is ZnS:Ag. This phosphor has a wide-band emission spectrum having an emission peak at approximately 448 nm. The y-coordinate of the chromaticity of the emission spectrum of ZnS:Ag ($y=0.054$) satisfies the EBU standards for the y-coordinate ($0.053 < y < 0.072$.)

In the J. Electrochem. Soc. reference it is described that by arranging an interference filter between the display screen and the face plate the Q can be increased, but that for ZnS:Ag only a slight increase thereof is possible without decreasing the y-coordinate to less than 0.053.

OBJECTS AND SUMMARY OF THE INVENTION

It is an object of the invention to provide a projection television system of the type defined in the opening paragraph which obviates the above-mentioned problem.

To that end, according to the invention, the projection television system is characterized in that the radiation emitted by the phosphor has a chromaticity having a y-coordinate greater than 0.054.

It has been found that it is then possible to obtain higher Q-values. In addition, it is possible to achieve higher values for the y-coordinate of the light emitted by the cathode-ray tube. A y-coordinate greater than 0.054 means that the peak wavelength exceeds 448 nm.

Preferably, the y-coordinate of the radiation emitted by the phosphor is located in the range between approximately 0.065 and 0.11. Expressed in the peak wavelength of the emission spectrum of the phosphor this corresponds to a peak wavelength in the range between approximately 453 and 468 nm.

An embodiment of the projection television system in accordance with the invention is characterized in that Cd is added to ZnS:Ag.

A further embodiment of the projection television system according to the invention, in which the lattice of ZnS:Ag is arranged in accordance with a sphalerite lattice, is characterized, in that in the lattice between 2 and 8% of the Zn atoms have been replaced by Cd atoms. A further embodiment of the projection television system according to the invention is characterized in that Se is added to the ZnS:Ag.

A still further embodiment of the projection television system according to the invention, in which the lattice of ZnS:Ag is arranged in accordance with a sphalerite lattice, is characterized, in that in the lattice between 5 and 13% of the S atoms have been replaced by Se atoms.

For the said values of the concentration Cd and/or Se the emission spectrum of the light emitted by the phosphor has a peak wavelength between approximately 453 and approximately 468 nm. Replacing Zn by Cd and S by Se has, in addition, an increased solubility of Ag-ions in the crystal lattice for its result; more Ag-ions in the lattice has for its result that saturation of the phosphor occurs at higher light intensities.

Partly replacing Zn by Cd also results in a change in the crystal structure, as a result of which the phosphor is more resistant to a prolonged electron bombardment.

In an embodiment of the projection television system according to the invention, the interference filter is of such a structure that the y-coordinate of the light emitted by the cathode-ray tube is located in the range between approximately 0.053 and approximately 0.072. The light emitted by the cathode-ray tube then satisfies the EBU standards for the y-coordinate.

In a further embodiment of the projection television system according to the invention, the interference filter is of such a structure that the y-coordinate of the light emitted by the cathode-ray tube is located in the range between approximately 0.072 and approximately 0.090. The light emitted by the cathode-ray tube then satisfies the NTSC standards for the y-coordinate.

BRIEF DESCRIPTION OF THE DRAWINGS

Some embodiments of the invention will now be described in greater detail by way of example with reference to the accompanying drawing, in which.

The FIGS. 1-3 are schematic views, and not drawn to scale, corresponding components in the different embodiments having generally been given the same reference numerals.

DESCRIPTION OF THE PREFERRED EMBODIMENTS

Figure 1:
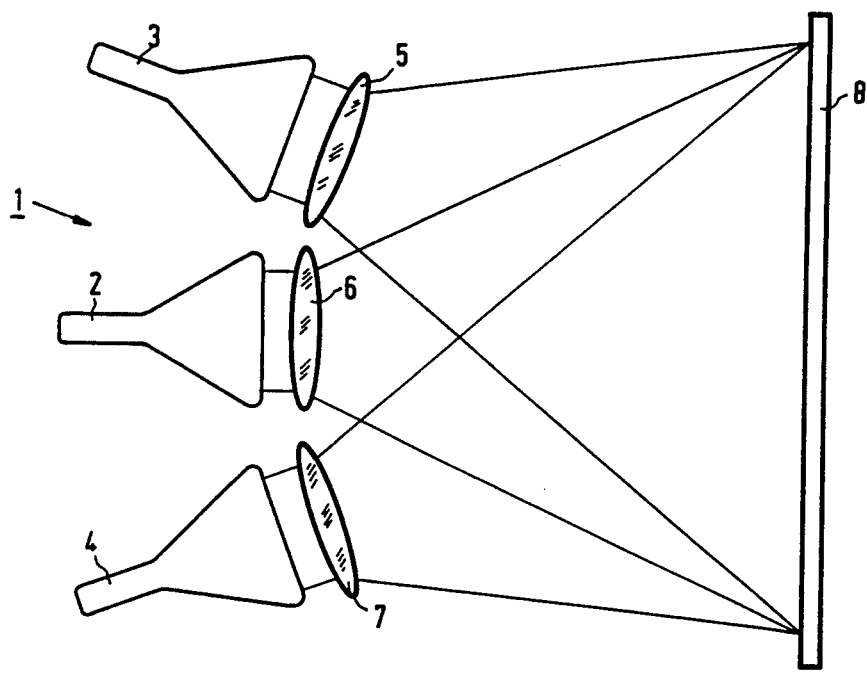
FIG. 1 is a cross-sectional view of a projection television system according to the invention.

FIG. 1 is a schematical view of a projection television system according to the invention.

The projection television system 1 includes three cathode-ray tubes 2, 3 and 4 for emitting a red, a green and a blue image, respectively. Three lens systems 5, 6 and 7, respectively, are positioned in front of the cathode-ray tubes. The images produced by the cathode-ray tubes 2, 3 and 4 are projected onto a screen 8. Cathode-ray tube 4 emits a blue image.

Figures 2, 3:
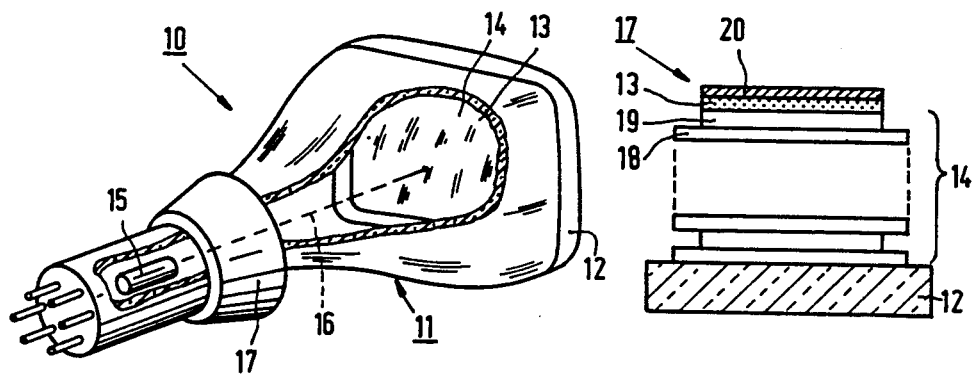
FIG. 2 is partly in section a perspective view of a cathode-ray tube suitable for a projection television system in accordance with the invention.
FIG. 3 is a cross-sectional view of a detail of the cathode-ray tube shown in FIG. 2.

FIG. 2 is a perspective view of a cathode-ray tube suitable for use in a projection television system according to the invention. In this example the cathode-ray tube 10 has an evacuated envelope 11, a face plate 12, the interior side of which is coated with a display screen 13 which contains a phosphor having a chromaticity whose y-value is greater than 0.054. An interference filter 14 is disposed between the display screen 13 and the face plate 12. Cathode-ray tube 10 also includes an electron gun 15 for emitting an electron beam 16 and a deflection unit 17 for deflecting the electron beam 16 over the display screen 13.

FIG. 3 is a cross-sectional view of a detail of the cathode-ray tube shown in FIG. 2. In this embodiment, the display window is flat. The display screen 13 is provided on the interior side of the face plate An interference filter 14 is disposed between the face plate 12 and the display screen 13. In this example the display screen 13 is coated with an aluminium layer 20. The interference filter contains a stack of layers 18 having a high index of refraction and layers 19 having a low index of refraction.

Figure 4A:
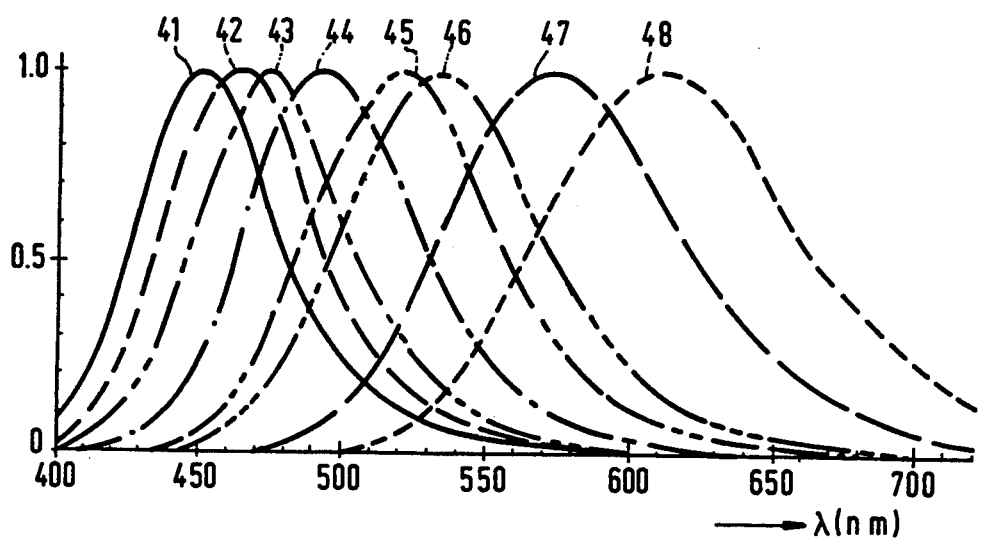
FIGS. 4a and 4b are graphs showing the emission spectra of Zn(Cd)S(Se):Ag as a function of the content of Cd and Se, respectively.

FIG. 4a shows in the form of a graph the emission spectra of Zn(Cd)S:Ag as a function of the Cd content. The horizontal axis indicates the wavelength $\lambda$ in nm, the vertical axis indicates the spectral energy in random units. Line 41 represents the spectral energy distribution for pure ZnS:Ag; lines 42 to 48 represent the spectral energy distribution for Zn(Cd)S:Ag with Zn partially replaced by 5, 10, 20, 30, 40, 50 and 60% atom Cd, respectively. As the Cd content becomes higher, the peak wavelength increases.

Figure 4B:
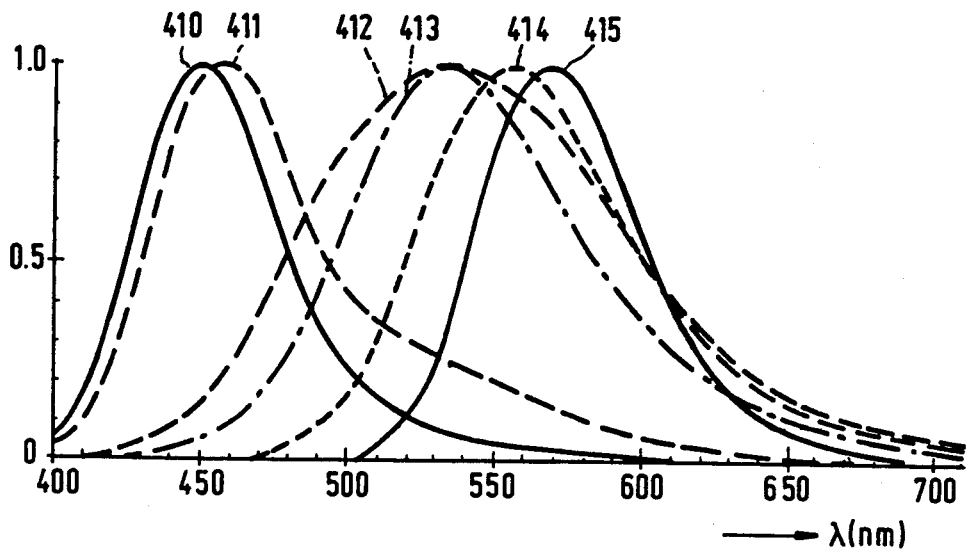

FIG. 4b shows in the form of a graph the emission spectrum of ZnS(Se):Ag as a function of the content of Se. The horizontal axis indicates the wavelength $\lambda$ in nm, the vertical axis the spectral energy in random units. Line 410 corresponds to line 41 in FIG. 4a and represents the spectral energy distribution for pure ZnS:Ag; lines 411 to 415 represent the spectral energy distribution for ZnS(Se):Ag with S replaced by 10, 30, 50, 70 and 100% atom Se, respectively. As, the content of Se becomes higher, the peak wavelength increases.

Other admixtures are also possible, for example Te may replace S, Sr or Ba may replace Zn. In these Figures the ZnS:Ag phosphor is of the type whose crystal lattice is arranged in accordance with a sphalerite lattice.

ZnS:Ag also occurs in a different crystal shape, the wurtzite structure. Pure ZnS:Ag in the wurtzite structure has an emission spectrum whose y-coordinate is very low (approximately 0.035). Also this form, ZnS:Ag can be provided, within the scope of the present invention, with an admixture, so that the y-coordinate is greater than 0.054. Substitutions of Cd and Se Tor Zn and S which are necessary for such a high value of the y-coordinate, are for the wurtzite structure, approximately an additional 15% beyond those for the sphalerite structure.

Figure 5:
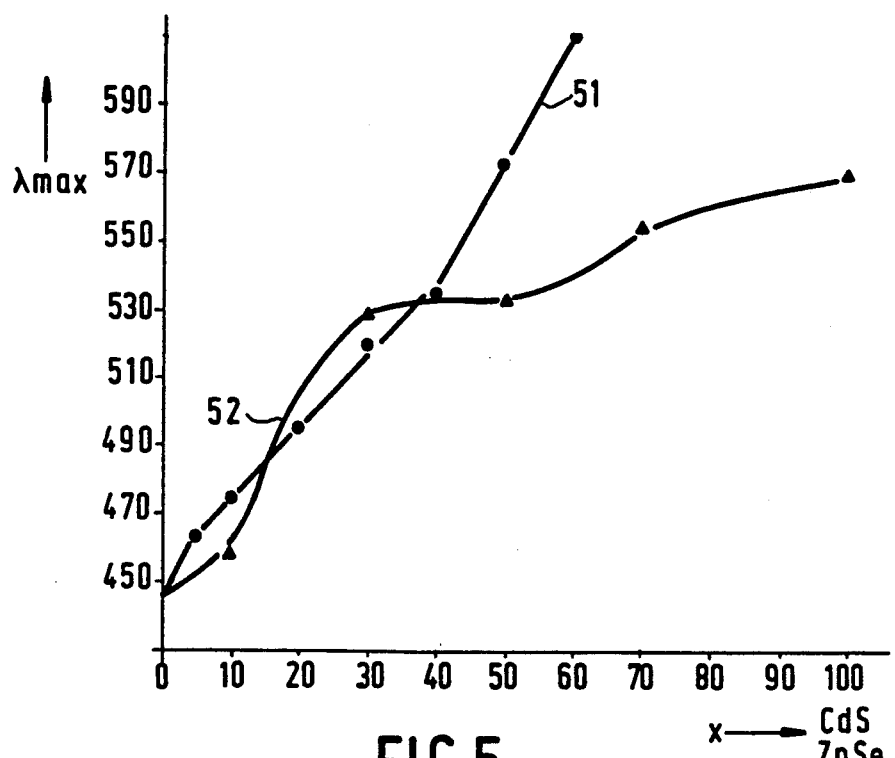
FIG. 5 is a graph showing the peak wavelength of Zn(Cd)S(Se):Ag as a function of the content of Cd and Se.

FIG. 5 shows in the form of a graph the peak wavelength of the emission spectrum of Zn(Cd)S(Se):Ag as a function of the content of Cd (line 51) and Se (line 52). The horizontal axis shows the percentage of Cd or Se, pure ZnS:Ag being shown at the extreme left and pure CdS:Ag and ZnSe:Ag being shown at the extreme right. The vertical axis indicates the wavelength of the peak in the emission spectrum in nm. From this graph it follows that the light emitted by pure ZnS:Ag has a peak wavelength of approximately 448 nm.

It should be noted that it was found that replacing Zn by Cd and S by Se furthermore results in an increased solubility of Ag-ions in the crystal lattice: more Ag-ions in the lattice has for its result that saturation of the phosphor occurs at higher light intensities and that the phosphor is better resistant to a prolonged electron bombardment.

Figure 6:
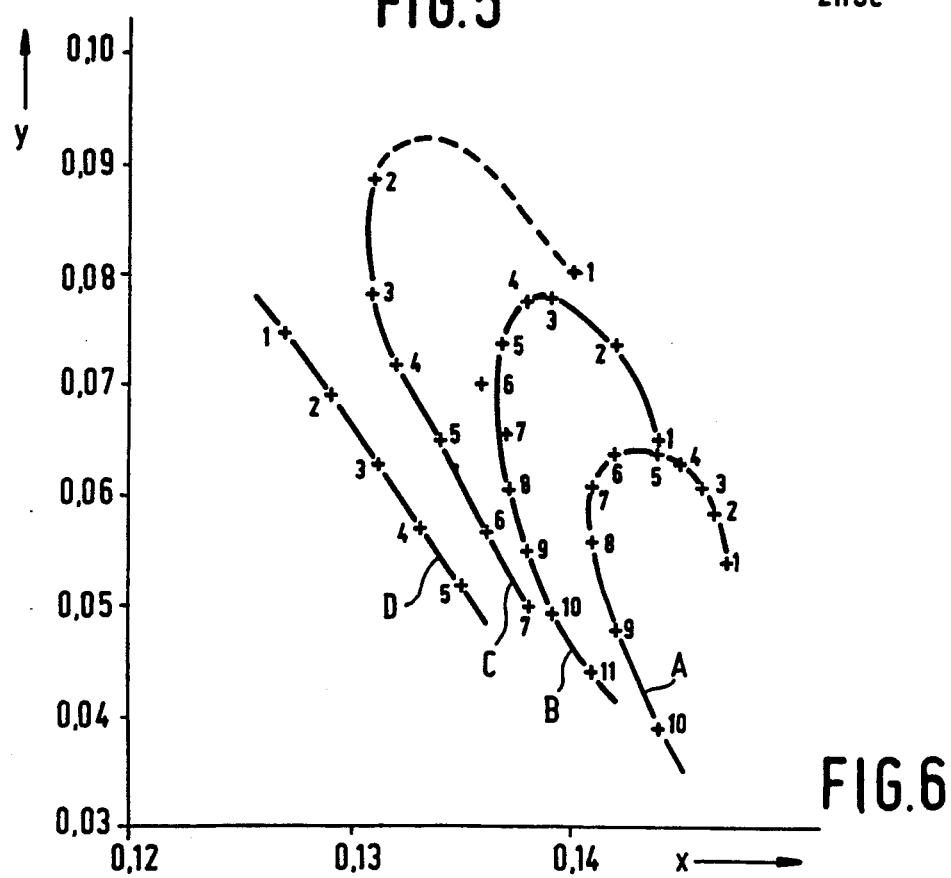
FIG. 6 is a graph showing the chromaticity coordinates of the light emitted by ZnS:Ag with and without admixtures, and the effect of an interference filter on the chromaticity coordinates.

FIG. 6 illustrates an important feature of the invention: x and y chromaticity coordinates of the light emitted by ZnS:Ag with and without admixtures, and the effect of an interference filter on the chromaticity coordinates. Line A represents the chromaticity coordinates for pure ZnS:Ag. An interference filter influences the emission spectrum of the light emitted by the cathode-ray tube in such a manner that the y-coordinate and the Q-value change. The horizontal axis in FIG. 6 represents the x-coordinate and the vertical axis represents the y-coordinate of the chromaticity coordinate. Point 1 ($x=0.147$, $y=0.054$) on line A represents the chromaticity coordinates of pure ZnS:Ag without interference filter. Points 2–10 on line A represent the chromaticity coordinates for pure ZnS:Ag for different interference filters. Line B represents the same for ZnS:Ag which is provided with such an admixture that the y-coordinate of the light emitted by the phosphor without a filter (point 1) is 0.065; line C represents the chromaticity coordinate for ZnS:Ag which is provided with such an admixture that the y-coordinate of the light emitted by the phosphor without a filter (point 1) is 0.08; line D is the same for ZnS:Ag provided with such an admixture that the y-coordinate of the light emitted by the phosphor without a filter is 0.11 except that for line D, the point corresponding to the phosphor emission without a filter has been omitted. Thus, point 1 of line D represents the phosphor emission with a filter.

The interference filters are shortwave pass filters. Table I shows the wavelength λ for which the gain by the filter of the light emitted by the phosphor is at its maximum for the different points. $Q/Q_0$ is the quotient of the Q-value for a point and the Q-value of pure ZnS:Ag without filter.

TABLE I

Data for the points shown in FIG. 6.

| Line | point | λf | $Q/Q_0$ | y-coordinate |
|------|-------|-----|---------|--------------|
| A | 1 | — | 1 | 0.054 |
| A | 2 | 560 | 1.025 | 0.059 |
| A | 3 | 550 | 1.028 | 0.061 |
| A | 4 | 540 | 1.036 | 0.063 |
| A | 5 | 530 | 1.060 | 0.064 |
| A | 6 | 520 | 1.085 | 0.064 |
| A | 7 | 510 | 1.130 | 0.061 |
| A | 8 | 500 | 1.177 | 0.056 |
| A | 9 | 490 | 2.263 | 0.048 |
| A | 10 | 480 | 1.368 | 0.039 |
| B | 1 | — | 1.002 | 0.065 |
| B | 2 | 550 | 1.039 | 0.074 |
| B | 3 | 530 | 1.071 | 0.078 |
| B | 4 | 520 | 1.093 | 0.078 |
| B | 5 | 510 | 1.136 | 0.074 |
| B | 6 | 505 | 1.172 | 0.070 |
| B | 7 | 500 | 1.200 | 0.066 |
| B | 8 | 495 | 1.239 | 0.061 |
| B | 9 | 490 | 1.299 | 0.055 |
| B | 10 | 485 | 1.332 | 0.050 |
| B | 11 | 480 | 1.388 | 0.044 |
| C | 1 | — | 0.978 | 0.080 |
| C | 2 | 510 | 1.142 | 0.089 |
| C | 3 | 500 | 1.191 | 0.079 |
| C | 4 | 495 | 1.236 | 0.072 |
| C | 5 | 490 | 1.275 | 0.065 |
| C | 6 | 485 | 1.335 | 0.057 |
| C | 7 | 480 | 1.397 | 0.049 |
| D | 1 | 485 | 1.239 | 0.075 |
| D | 2 | 482.5 | 1.252 | 0.069 |
| D | 3 | 480 | 1.266 | 0.063 |
| D | 4 | 477.5 | 1.283 | 0.057 |
| D | 5 | 475 | 1.282 | 0.052 |

FIG. 6 and Table I show that admixtures of ZnS:Ag with other components in combination with the use of an interference filter provide the following advantages:
 A: For a given y-value it is possible to achieve a higher Q-value (as indicated by $Q/Q_0$).
 B: It is possible to realize values for the y-coordinate which exceed those for pure ZnS:Ag.
This last advantage means, for example, that it is possible to achieve a y-value which satisfies the NTSC standards. For the y-coordinate these standards prescribe that the coordinate must be located between 0.070 and 0.090. The EBU standards prescribe that the y-coordinate must be located between 0.052 and 0.072.
Depending on the y-value, the Q has a maximum tor phosphor compositions having coordinates between lines B and D. This means that preferably so much Cd and/or Se is added to ZnS:Ag that the y-coordinate of the light emitted by the phosphor is located in the range between 0.065 and 0.11. Line B corresponds to a phosphor whose emission spectrum has a peak wavelength of approximately 453 nm. Line C corresponds to a phosphor whose emission spectrum has a peak wavelength of approximately 458 nm. As is shown in FIG. 4, for such a value of the peak wavelength an admixture of approximately 3% Cd or approximately 8% Se is required.

It will be obvious that within the scope of the invention many variations are possible for a person skilled in the art. The invention is, for example, not limited by the shape of the cathode-ray tube or the television projection system. The cathode-ray tube may, for example, may be a flat tube. The projection television system may, for example, comprise dichroic mirrors, the three cathode-ray tubes being arranged in the form of a cross.

The face plate of the cathode-ray tube may, for example, be of a curved shape. It will also be obvious that the phosphor can contain both Cd and Se.

The interference filter may either be a shortwave pass filter or a bandpass filter. Generally, the phosphor contains one or more co-activators with Ag, for example Cl, Br, I, F, Al, Ga, and/or In.

We claim:

1. A projection television system comprising at least one cathode-ray tube, a lens system and a screen, the tube having a face plate, a display screen coated with a blue cathodoluminescent phosphor containing ZnS:Ag, and an interference filter arranged between the face plate and the display screen, characterized in that the radiation emitted by the phosphor has a chromaticity having a y-coordinate located in the range between approximately 0.065 and 0.11.

2. A projection television system as claimed in claim 1, characterized in that Cd is added to ZnS:Ag.

3. A projection television system as claimed in claim 2, in which the lattice of ZnS:Ag is arranged in the sphalerite structure, characterized in that between 2 and 8% of Zn atoms are replaced by Cd atoms.

4. A projection television system as claimed in claim 3, characterized in that the y-coordinate of the light emitted by the cathode-ray tube is located in the range between approximately 0.072 and the approximately 0.090.

5. A projection television system as claimed in claim 3, characterized in that the y-coordinate of the light emitted by the cathode-ray tube is located in the range between approximately 0.053 and approximately 0.072.

6. A projection television system as claimed in claim 2, in which the lattice of ZnS:Ag is arranged in the wurtzite structure, characterized in that between 17 and 23% of the Zn atoms are replaced by Cd atoms.

7. A projection television system as claimed in claim 6, characterized in that the y-coordinate of the light emitted by the cathode-ray tube is located in the range between approximately 0.053 and approximately 0.072.

8. A projection television system as claimed in claim 6, characterized in that the y-coordinate of the light emitted by the cathode-ray tube is located in the range between approximately 0.072 and the approximately 0.090.

9. A projection television system as claimed in claim 2, characterized in that the y-coordinate of the light emitted by the cathode-ray tube is located in the range between approximately 0.053 and approximately 0.072.

10. A projection television system as claimed in claim 2, characterized in that the y-coordinate of the light emitted by the cathode-ray tube is located in the range between approximately 0.072 and the approximately 0.090.

11. A projection television system as claimed in claim 1, characterized in that Se is added to ZnS:Ag.

12. A projection television system as claimed in claim 11, in which the lattice of ZnS:Ag is arranged in the sphalerite structure, characterized in that between 5 and 13% of the S atoms have been replaced by Se atoms.

13. A projection television system as claimed in claim 12, characterized in that the y-coordinate of the light emitted by the cathode-ray tube is located in the range between approximately 0.053 and approximately 0.072.

14. A projection television system as claimed in claim 12, characterized in that the y-coordinate of the light emitted by the cathode-ray tube is located in the range between approximately 0.072 and the approximately 0.090.

15. A projection television system as claimed in claim 11, in which the lattice of ZnS:Ag is arranged in the wurtzite structure, characterized in that between 20 and 28% of the S atoms have been replaced by Se atoms.

16. A projection television system as claimed in claim 15, characterized in that the y-coordinate of the light emitted by the cathode-ray tube is located in the range between approximately 0.072 and the approximately 0.090.

17. A projection television system as claimed in claim 15, characterized in that the y-coordinate of the light emitted by the cathode-ray tube is located in the range between approximately 0.053 and approximately 0.072.

18. A projection television system as claimed in claim 11, characterized in that the y-coordinate of the light emitted by the cathode-ray tube is located in the range between approximately 0.053 and approximately 0.072.

19. A projection television system as claimed in claim 11, characterized in that the y-coordinate of the light emitted by the cathode-ray tube is located in the range between approximately 0.072 and the approximately 0.090.

20. A projection television system as claimed in claim 1, characterized in that the y-coordinate of the light emitted by the cathode-ray tube is located in the range between approximately 0.053 and approximately 0.072.

21. A projection television system as claimed in claim 1, characterized in that the y-coordinate of the light emitted by the cathode-ray tube is located in the range between approximately 0.072 and approximately 0.090.

22. A cathode-ray tube suitable for use in a projection television system as claimed in any one of claims 1, 3–10, 15–20, and 22–27.

* * * * *